(12) United States Patent
Benisty

(10) Patent No.: US 11,726,715 B2
(45) Date of Patent: Aug. 15, 2023

(54) EFFICIENT DATA PATH IN COMPARE COMMAND EXECUTION

(71) Applicant: Western Digital Technologies, Inc., San Jose, CA (US)

(72) Inventor: Shay Benisty, Beer Sheva (IL)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/450,533

(22) Filed: Oct. 11, 2021

(65) Prior Publication Data

US 2023/0113376 A1     Apr. 13, 2023

(51) Int. Cl.
*G06F 3/06* (2006.01)

(52) U.S. Cl.
CPC .......... *G06F 3/0659* (2013.01); *G06F 3/0604* (2013.01); *G06F 3/0619* (2013.01); *G06F 3/0631* (2013.01); *G06F 3/0689* (2013.01)

(58) Field of Classification Search
None
See application file for complete search history.

(56) References Cited

U.S. PATENT DOCUMENTS

| | | | |
|---|---|---|---|
| 6,161,165 A | 12/2000 | Solomon et al. | |
| 6,438,665 B2 | 8/2002 | Norman | |
| 6,601,137 B1 | 7/2003 | Castro et al. | |
| 8,171,242 B2 | 5/2012 | Hong | |
| 9,378,049 B1 * | 6/2016 | Johnson | G06F 9/4411 |
| 10,310,810 B2 | 6/2019 | Fukuchi | |
| 2005/0036618 A1 | 2/2005 | Gammel et al. | |
| 2006/0200641 A1 | 9/2006 | Insley et al. | |
| 2008/0082744 A1 | 4/2008 | Nakagawa | |
| 2008/0244208 A1 | 10/2008 | Narendra et al. | |
| 2016/0085443 A1 * | 3/2016 | Tomishima | G06F 3/0689 711/114 |
| 2017/0285949 A1 | 10/2017 | Trika et al. | |
| 2019/0004975 A1 | 1/2019 | Benisty | |
| 2019/0074852 A1 * | 3/2019 | Khon | H04L 1/0045 |

OTHER PUBLICATIONS

International Search Report and Written Opinion for International Application No. PCT/US2022/028422 dated Sep. 26, 2022.

* cited by examiner

*Primary Examiner* — Kaushikkumar M Patel
(74) *Attorney, Agent, or Firm* — Patterson + Sheridan, LLP; Steven H. VerSteeg

(57) ABSTRACT

The present disclosure generally relates to efficient execution of compare commands. Reads from the memory device for the compare commands are scheduled. Available chunks of data is received from the memory device, and the corresponding data is received from the host device. The data is compared. If the data does not match, the remaining reads are cancelled, and a compare completion is placed in the completion queue indicating a failed compare command. If all of the data matches, then a compare completion is placed in the completion queue indicating a successful compare command. Read transfers from the host device are scheduled based on availability of read data from the memory device side. By doing so, less buffers are needed to hold the data internally until both chunks of data are available. In so doing, synchronization between read data availability and retrieving data from the host device is synchronized.

20 Claims, 5 Drawing Sheets

EFFICIENT DATA PATH IN COMPARE COMMAND EXECUTION

BACKGROUND OF THE DISCLOSURE

Field of the Disclosure

Embodiments of the present disclosure generally relate to efficient execution of a compare command.

Description of the Related Art

Nonvolatile memory express (NVMe) is an interface protocol for a host device and a data storage device, such as a solid state drive (SSD), based on a paired submission and completion queue mechanism. Commands are placed by host software into a submission queue. Completions are placed into a completion queue by a controller of the data storage device. Submission and completion queues are allocated in a memory of a host device.

A compare command is one of the command sets in the NVMe protocol. When receiving a compare command, the data storage device reads specified data for a logical operation address or addresses from a storage medium or memory device of the data storage device, and compares the data from the data storage device to data transferred from the host device as part of the command. If the data read from the data storage device and the data received from the host device are equivalent with no miss-compares, then the compare command completes with a compare success posted to the completion queue. If there are any miss-compares, the compare command completes with a compare failure posted to the completion queue.

One issue facing host devices and data storage devices operating under the NVMe protocol is high required bandwidth for the compare workload. Whereas in the client SSD market, there are not any special performance requirements for compare command execution, in the enterprise SSD market, the requirements are very high. For example, the needed bandwidth is 9 GB/sec for a 64 KB compare command workload assuming peripheral component express (PCIe) Gen5x4. Since the performance required is high, efficient buffer management is required so that the device controller does not need to incorporate extra buffers.

Therefore, there is a need in the art for an improved data storage device and method of executing a compare command, such as a compare command under the NVMe protocol.

SUMMARY OF THE DISCLOSURE

The present disclosure generally relates to efficient execution of compare commands. Reads from the memory device for the compare commands are scheduled. Available chunks of data is received from the memory device, and the corresponding data is received from the host device. The data is compared. If the data does not match, the remaining reads are cancelled, and a compare completion is placed in the completion queue indicating a failed compare command. If the data does match, additional chunks of data is retrieved and compared. If all of the data matches, then a compare completion is placed in the completion queue indicating a successful compare command. The compare is performed using a redundant array of inexpensive/independent disks (RAID). Read transfers from the host device are scheduled based on availability of read data from the memory device. By doing so, less buffers are needed to hold the data internally until both chunks of data are available (i.e., read from memory device and read from host device). In so doing, synchronization between read data availability and retrieving data from the host device is synchronized, which minimizes a need for internal buffers. Additionally, compare command failures can be determined without retrieving all of the data, and the actual comparing can begin before all of the data is retrieved.

In one embodiment, a data storage device comprises: a memory device; and a controller coupled to the memory device, wherein the controller is configured to: fetch a compare command from a host device; retrieve a chunk of data from the memory device, wherein the chunk of data is less than all data associated with the compare command, and wherein the chunk of data is retrieved from the memory device; retrieve relevant chunk of data from the host device, wherein the relevant chunk of data; compare the chunk of data and the relevant chunk of data; and enter a completion entry to a completion queue of the host device.

In another embodiment, a data storage device comprises: a memory device; and a controller coupled to the memory device, wherein the controller is configured to: compare less than all data for a compare command, wherein the data is data retrieved from the memory device and from a host device, wherein the comparing is performed using a redundant array of inexpensive/independent disks (RAID).

In another embodiment, a data storage device comprises: memory means; and a controller coupled to the memory means, wherein the controller is configured to: fetch less than all data to be compared from a host device; decode a chunk of data retrieved from the memory means, wherein the decoding and the fetching occur in parallel; and compare the fetched data and decoded chunk of data.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to efficient execution of compare commands. Reads from the memory device for the compare commands are scheduled. Available chunks of data is received from the memory device, and the corresponding data is received from the host device. The data is compared. If the data does not match, the remaining reads are cancelled, and a compare completion is placed in the completion queue indicating a failed compare command. If the data does match, additional chunks of data is retrieved and compared. If all of the data matches, then a compare completion is placed in the completion queue indicating a successful compare command. The compare is performed using a redundant array of inexpensive/independent disks (RAID). Read transfers from the host device are scheduled based on availability of read data from the memory device. By doing so, less buffers are needed to hold the data internally until both chunks of data are available (i.e., read from memory device and read from host device). In so doing, synchronization between read data availability and retrieving data from the host device is synchronized, which minimizes a need for internal buffers. Additionally, compare command failures can be determined without retrieving all of the data, and the actual comparing can begin before all of the data is retrieved.

Figure 1:
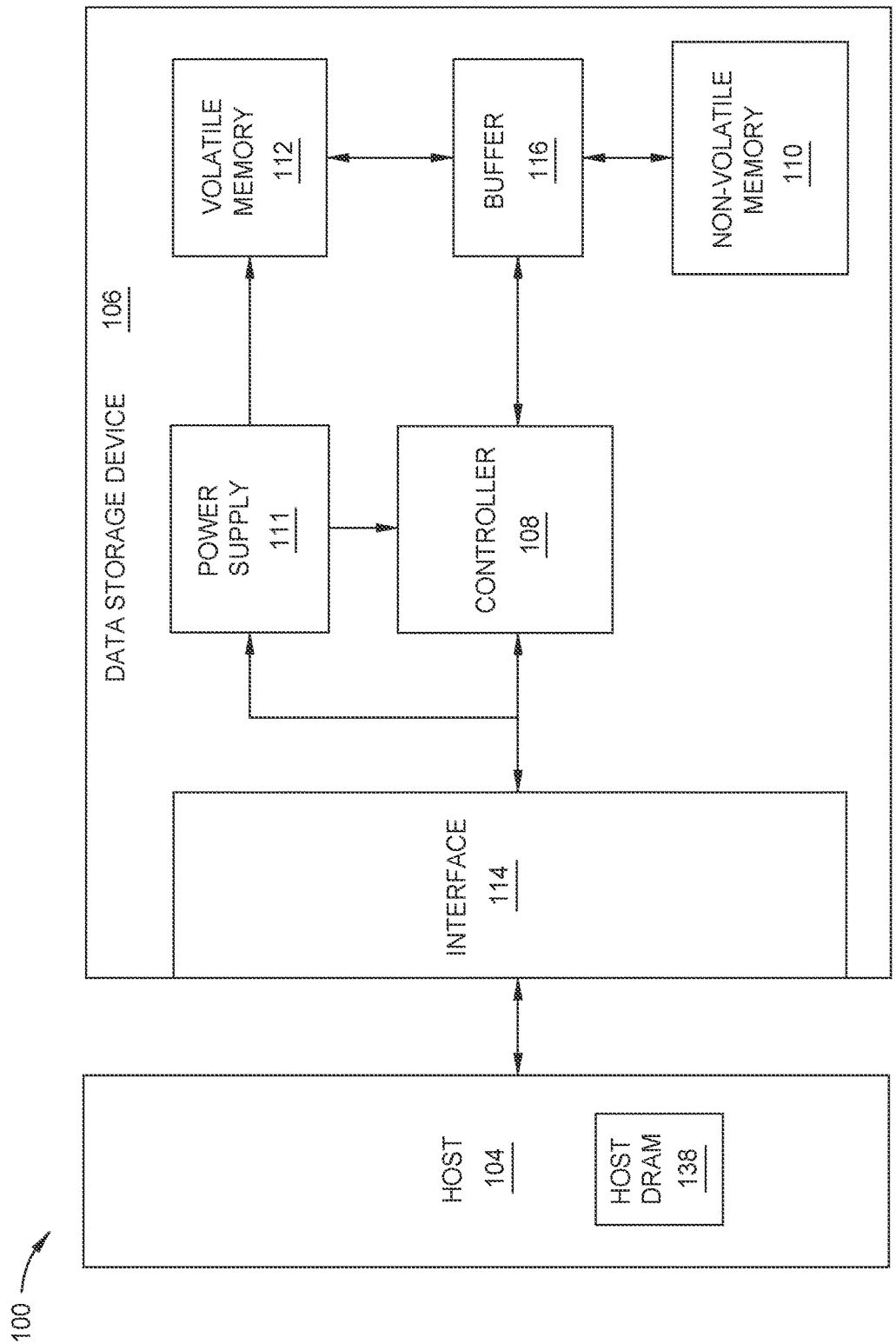
FIG. 1 is a schematic block diagram illustrating a storage system in which a data storage device may function as a storage device for a host device, according to certain embodiments.

FIG. 1 is a schematic block diagram illustrating a storage system 100 in which a host device 104 is in communication with a data storage device 106, according to certain embodiments. For instance, the host device 104 may utilize a non-volatile memory (NVM) 110 included in data storage device 106 to store and retrieve data. The host device 104 comprises a host DRAM 138. In some examples, the storage system 100 may include a plurality of storage devices, such as the data storage device 106, which may operate as a storage array. For instance, the storage system 100 may include a plurality of data storage devices 106 configured as a redundant array of inexpensive/independent disks (RAID) that collectively function as a mass storage device for the host device 104.

The host device 104 may store and/or retrieve data to and/or from one or more storage devices, such as the data storage device 106. As illustrated in FIG. 1, the host device 104 may communicate with the data storage device 106 via an interface 114. The host device 104 may comprise any of a wide range of devices, including computer servers, network-attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or other devices capable of sending or receiving data from a data storage device.

The data storage device 106 includes a controller 108, NVM 110, a power supply 111, volatile memory 112, the interface 114, and a write buffer 116. In some examples, the data storage device 106 may include additional components not shown in FIG. 1 for the sake of clarity. For example, the data storage device 106 may include a printed circuit board (PCB) to which components of the data storage device 106 are mechanically attached and which includes electrically conductive traces that electrically interconnect components of the data storage device 106 or the like. In some examples, the physical dimensions and connector configurations of the data storage device 106 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe x1, x4, x8, x16, PCIe Mini Card, MiniPCI, etc.). In some examples, the data storage device 106 may be directly coupled (e.g., directly soldered or plugged into a connector) to a motherboard of the host device 104.

Interface 114 may include one or both of a data bus for exchanging data with the host device 104 and a control bus for exchanging commands with the host device 104. Interface 114 may operate in accordance with any suitable protocol. For example, the interface 114 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), PCI, and PCIe, non-volatile memory express (NVMe), OpenCAPI, GenZ, Cache Coherent Interface Accelerator (CCIX), Open Channel SSD (OCSSD), or the like. Interface 114 (e.g., the data bus, the control bus, or both) is electrically connected to the controller 108, providing an electrical connection between the host device 104 and the controller 108, allowing data to be exchanged between the host device 104 and the controller 108. In some examples, the electrical connection of interface 114 may also permit the data storage device 106 to receive power from the host device 104. For example, as illustrated in FIG. 1, the power supply 111 may receive power from the host device 104 via interface 114.

The NVM 110 may include a plurality of memory devices or memory units. NVM 110 may be configured to store and/or retrieve data. For instance, a memory unit of NVM 110 may receive data and a message from controller 108 that instructs the memory unit to store the data. Similarly, the memory unit may receive a message from controller 108 that instructs the memory unit to retrieve data. In some examples, each of the memory units may be referred to as a die. In some examples, the NVM 110 may include a plurality of dies (i.e., a plurality of memory units). In some examples, each memory unit may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory unit may include any type of non-volatile memory devices, such as flash memory devices, phase-change memory (PCM) devices, resistive random-access memory (ReRAM) devices, magneto-resistive random-access memory (MRAM) devices, ferroelectric random-access memory (F-RAM), holographic memory devices, and any other type of non-volatile memory devices.

The NVM 110 may comprise a plurality of flash memory devices or memory units. NVM Flash memory devices may include NAND or NOR-based flash memory devices and may store data based on a charge contained in a floating gate of a transistor for each flash memory cell. In NVM flash memory devices, the flash memory device may be divided into a plurality of dies, where each die of the plurality of dies includes a plurality of physical or logical blocks, which may be further divided into a plurality of pages. Each block of the plurality of blocks within a particular memory device may include a plurality of NVM cells. Rows of NVM cells may be electrically connected using a word line to define a page of a plurality of pages. Respective cells in each of the plurality of pages may be electrically connected to respective bit lines. Furthermore, NVM flash memory devices may be 2D or 3D devices and may be single level cell (SLC), multi-level cell (MLC), triple level cell (TLC), or quad level cell (QLC). The controller 108 may write data to and read data from NVM flash memory devices at the page level and erase data from NVM flash memory devices at the block level.

The power supply 111 may provide power to one or more components of the data storage device 106. When operating in a standard mode, the power supply 111 may provide power to one or more components using power provided by an external device, such as the host device 104. For instance, the power supply 111 may provide power to the one or more components using power received from the host device 104 via interface 114. In some examples, the power supply 111 may include one or more power storage components configured to provide power to the one or more components when operating in a shutdown mode, such as where power ceases to be received from the external device. In this way, the power supply 111 may function as an onboard backup power source. Some examples of the one or more power storage components include, but are not limited to, capacitors, super-capacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The volatile memory 112 may be used by controller 108 to store information. Volatile memory 112 may include one or more volatile memory devices. In some examples, controller 108 may use volatile memory 112 as a cache. For instance, controller 108 may store cached information in volatile memory 112 until the cached information is written to the NVM 110. As illustrated in FIG. 1, volatile memory 112 may consume power received from the power supply 111. Examples of volatile memory 112 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, LPDDR4, and the like)).

Controller 108 may manage one or more operations of the data storage device 106. For instance, controller 108 may manage the reading of data from and/or the writing of data to the NVM 110. In some embodiments, when the data storage device 106 receives a write command from the host device 104, the controller 108 may initiate a data storage command to store data to the NVM 110 and monitor the progress of the data storage command. Controller 108 may determine at least one operational characteristic of the storage system 100 and store at least one operational characteristic in the NVM 110. In some embodiments, when the data storage device 106 receives a write command from the host device 104, the controller 108 temporarily stores the data associated with the write command in the internal memory or write buffer 116 before sending the data to the NVM 110.

Figure 2:
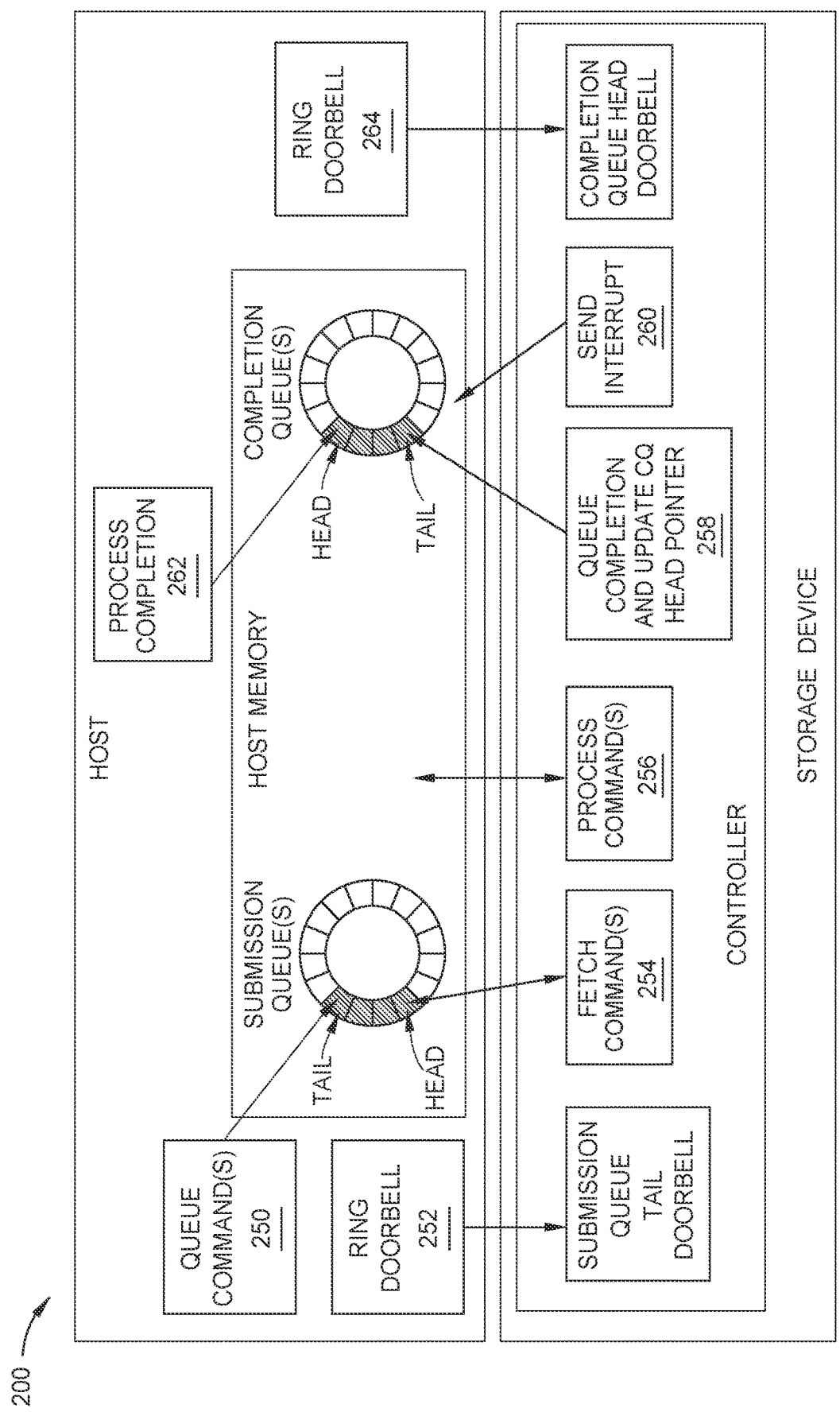
FIG. 2 is a block diagram illustrating a method of operating a storage device to execute a read or write command, according to one embodiment.

FIG. 2 is a block diagram illustrating a method 200 of operating a storage device to execute a read, write, or compare command, according to one embodiment. Method 200 may be used with the storage system 100 having a host device 104 and a data storage device 106 comprising a controller 108. Method 200 may be used with the device a host device and a data storage device comprising a command processor.

Method 200 begins at operation 250, where the host device writes a command into a submission queue as an entry. The host device may write one or more commands into the submission queue at operation 250. The commands may be read commands or write commands or compare commands. The host device may comprise one or more submission queues. The host device may write one or more commands to the submission queue in any order (i.e., a submission order), regardless of the sequential write order of the one or more commands (i.e., a sequential processing order).

In operation 252, the host device writes one or more updated submission queue tail pointers and rings a doorbell or sends an interrupt signal to notify or signal the storage device of the new command that is ready to be executed. The host may write an updated submission queue tail pointer and send a doorbell or interrupt signal for each of the submission queues if there are more than one submission queues. In operation 254, in response to receiving the doorbell or interrupt signal, a controller of the storage device fetches the command from the one or more submission queue, and the controller receives or DMA reads the command.

In operation 256, the controller processes the command and writes, transfers data associated with a read command to the host device memory, or retrieves data for a compare command. The controller may process more than one command at a time. The controller may process one or more commands in the submission order or in the sequential order. Processing a write command may comprise identifying a stream to write the data associated with the command to and writing the data to one or more logical block address (LBA) of the stream.

In operation 258, once the command has been fully processed, the controller writes a completion entry corresponding to the executed command to a completion queue of the host device and moves or updates the CQ head pointer to point to the newly written completion entry.

In operation 260, the controller generates and sends an interrupt signal or doorbell to the host device. The interrupt signal indicates that the command has been executed and data associated with the command is available in the memory device. The interrupt signal further notifies the host device that the completion queue is ready to be read or processed.

In operation 262, the host device processes the completion entry. In operation 264, the host device writes an updated CQ head pointer to the storage device and rings the doorbell or sends an interrupt signal to the storage device to release the completion entry.

Figure 3:
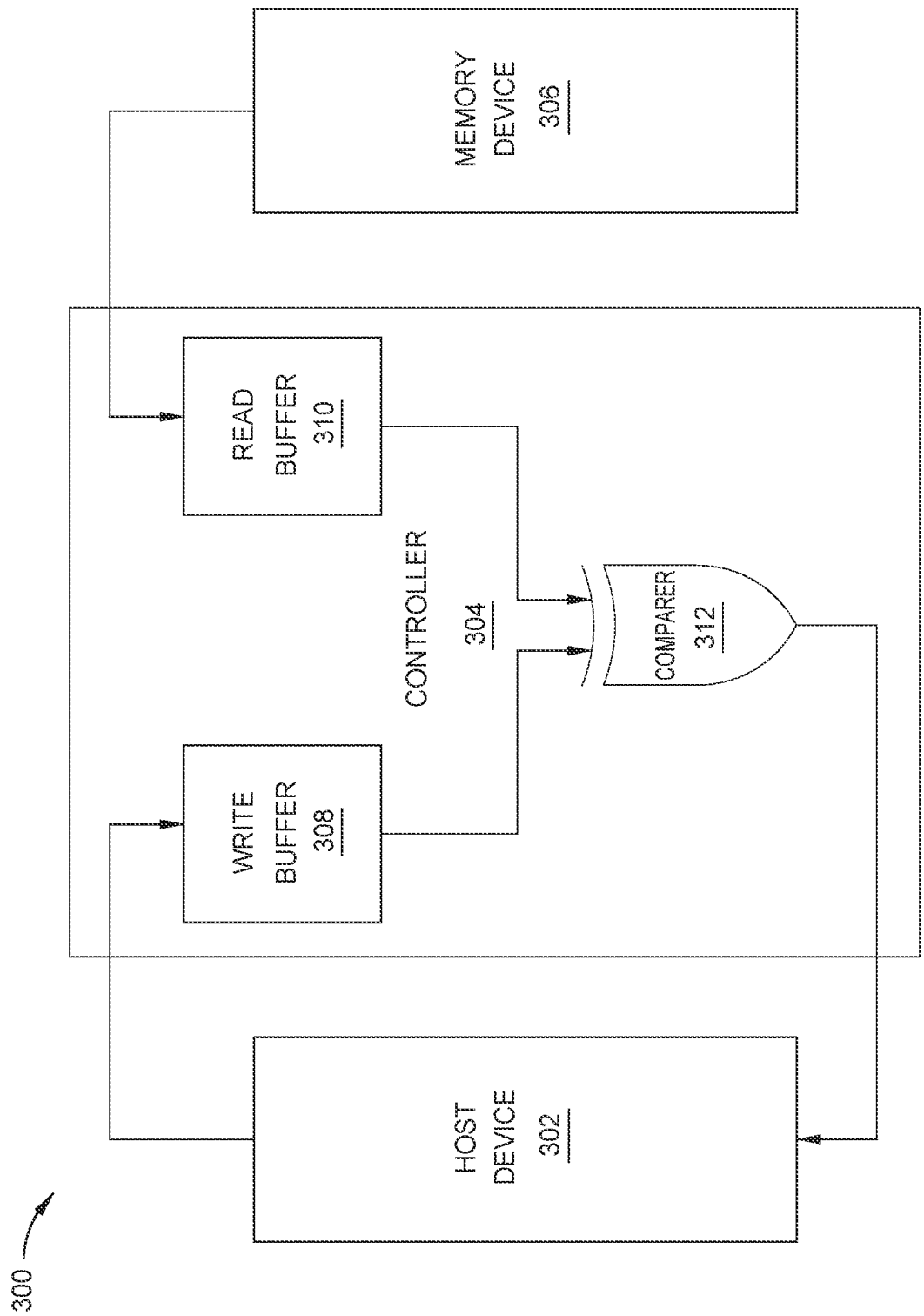
FIG. 3 is a schematic illustration of a compare command data flow according to one embodiment.

For a compare command, the host device places a compare command in the submission queue, and the data storage device then proceeds to perform the compare operation. FIG. 3 is a schematic illustration 300 of a compare command data flow according to one embodiment. The controller 304 retrieves the data to be compared from the host device 302 and places the data in the write buffer 308. The controller 304 also retrieves the read data from the memory device 306 and places the read data in the read buffer 310. The data from the write buffer 308 and the read buffer 310 is fed to the comparer 312 that compares the data, such as by performing an XOR comparison. The results of the compare command are delivered back to the host device 302.

If the host data transfer is not synchronized with the memory device data transfer, the write buffer 308 and the read buffer 310 will need to be quite large or, at the very least, multiple buffers will be needed. Furthermore, the comparer 312 is dedicated to handling compare commands, which leads to additional device components to meet device performance requirements.

It has surprisingly been found that performance of a compare command execution can be increased in order to be aligned with enterprise SSD requirements. Host data transfer and memory device data transfer can be synchronized. More specifically, when a chunk of data is available from the memory device, the corresponding relevant chunk of data is fetched from the host device. The chunk of data that is retrieved may be out of order from the host data order, but it is contemplated that the relevant data from the host may be retrieved in order. Regardless, while the host data is retrieved, the chunk of data retrieved from the memory device is decoded in parallel. In so doing, the decoding of the chunk of data will complete at substantially the same time as the relevant data is retrieved. As the data is retrieved in chunks, fewer buffer storage space (or even fewer buffers) is necessary. Even though fewer buffers or buffer space are needed, performance does not suffer because the data is processed in chunks rather than waiting for all of the data to arrive prior to performing the compare operation. Furthermore, if the compare command fails for any chunk of data, then the entire compare command fails. Thus, the compare command failure can be determined much faster than if all the data is first retrieved. Additionally, to process the compare command, rather than utilize a dedicated comparer or processor, a redundant array of inexpensive/independent disks (RAID) engine can be used. By using a RAID engine and performing the decoding in parallel with retrieving data from the host device, very high bandwidth is achieved for the compare command execution with the limit being either in host device lines or memory device lines.

Figure 4:
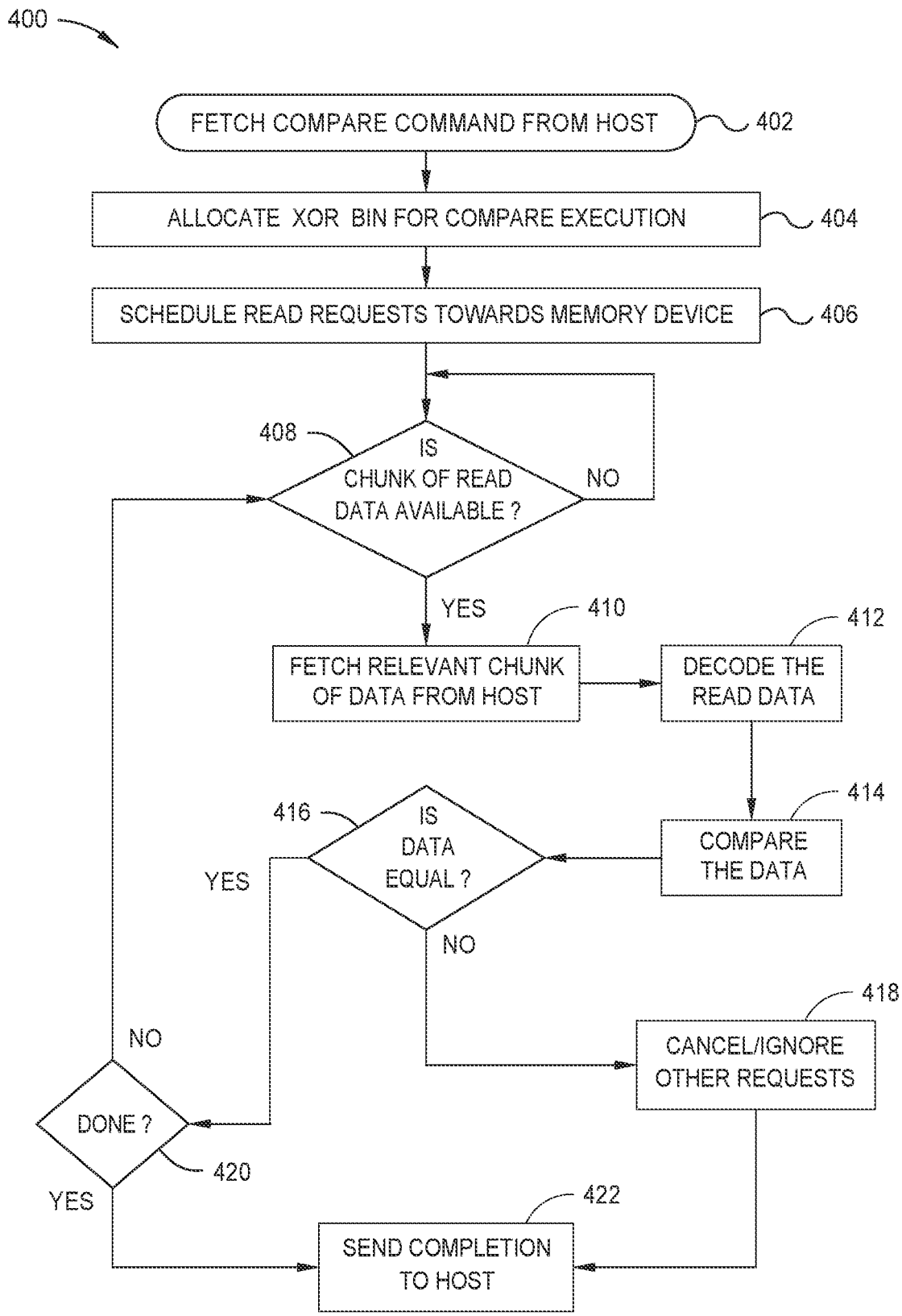
FIG. 4 is a flowchart illustrating a compare command flow.

FIG. 4 is a flowchart illustrating a compare command flow 400. The flow 400 starts by fetching a compare command from the host at 402. Next a XOR bin is allocated for the execution of the compare command using a RAID engine at 404. Read requests associated with the compare command are scheduled towards the memory device at 406. At 408, the controller waits for a chunk of the requested data to be available from the memory device. If a chunk of data is not yet ready, then the controller continues to wait.

If a chunk of data is available at 408, then it is time to fetch the relevant chunk of data from the host device at 410. It is possible that the relevant chunk of data that corresponds to the available chunk of data is the first chunk of data of the compare command (i.e., the relevant data is retrieved in order), but the relevant chunk of data need not be retrieved in the order in which the data appears in the host device. Rather, the relevant data can be retrieved out of order so long as the relevant chunk of data from the host corresponds to the available chunk of data from the memory device. While the relevant chunk of data is retrieved at 410, the available chunk of data from the memory device is decoded at 412. The decoding is performed in parallel to the fetching in order to increase throughput and decrease the need for buffer space, but it is contemplated that the fetching and decoding may occur in series (in any order) or partially overlap in time.

Once the available chunk of data has been decoded, and the relevant chuck of data has been retrieved, the RAID engine can compare the data at 414. Note that the data being compared is less than all of the data of the compare command. The compare occurs as the data from the memory device becomes available.

If the data is not equal at 416 during the compare operation, then all other retrieval and fetching for the compare command are cancelled or ignored at 418, and a completion is sent to the host device at 422 via the completion queue to indicate that the compare command has failed. Note that because less than all of the data is being compared, the compare command failure can be determined much faster than waiting for all data to be retrieved and fetched. The worst case scenario is that the last chunk of retrieved and fetched data fails the comparison and thus, the compare command in such a situation fails in approximately the same amount of time as if all of the data had been fetched and retrieved prior to the comparison.

If the data is equal at 416, then at 420 a determination is made regarding whether all of the data has been compared or whether there are more chunks of data to retrieve and fetch and compare. If all the data has not been compared, then the controller waits to see if any additional chunks of data are available at 408. If all of the data has been compared, then a completion is sent to the host device at 422 via the completion queue to indicate that the compare command has completed successfully. While a failed compare command can be detected much earlier using the method, a successful completion of the compare command will take approximately the same amount of time as if all of the data had been fetched and retrieved prior to the comparison.

The data transfer of the write command (i.e., data retrieved from the host device) is synchronized with the read data transfer (i.e., data retrieved from the memory device). If any chunk of memory data is available, the relevant chunk of data from the host device with the same offset from the command is fetched. In parallel, the read data is decoded. Once the decoding operation is completed, the data from the host device is available internally. The RAID engine is then utilized for the compare operation. If there is a mismatch, the compare command is completed and all other pending requests are aborted. Otherwise, the logic waits for the next chunk of memory device data unless completing the entire memory device data transfer. In the case of completing the entire memory device data transfer, a completion message is posted to the host device.

Figure 5:
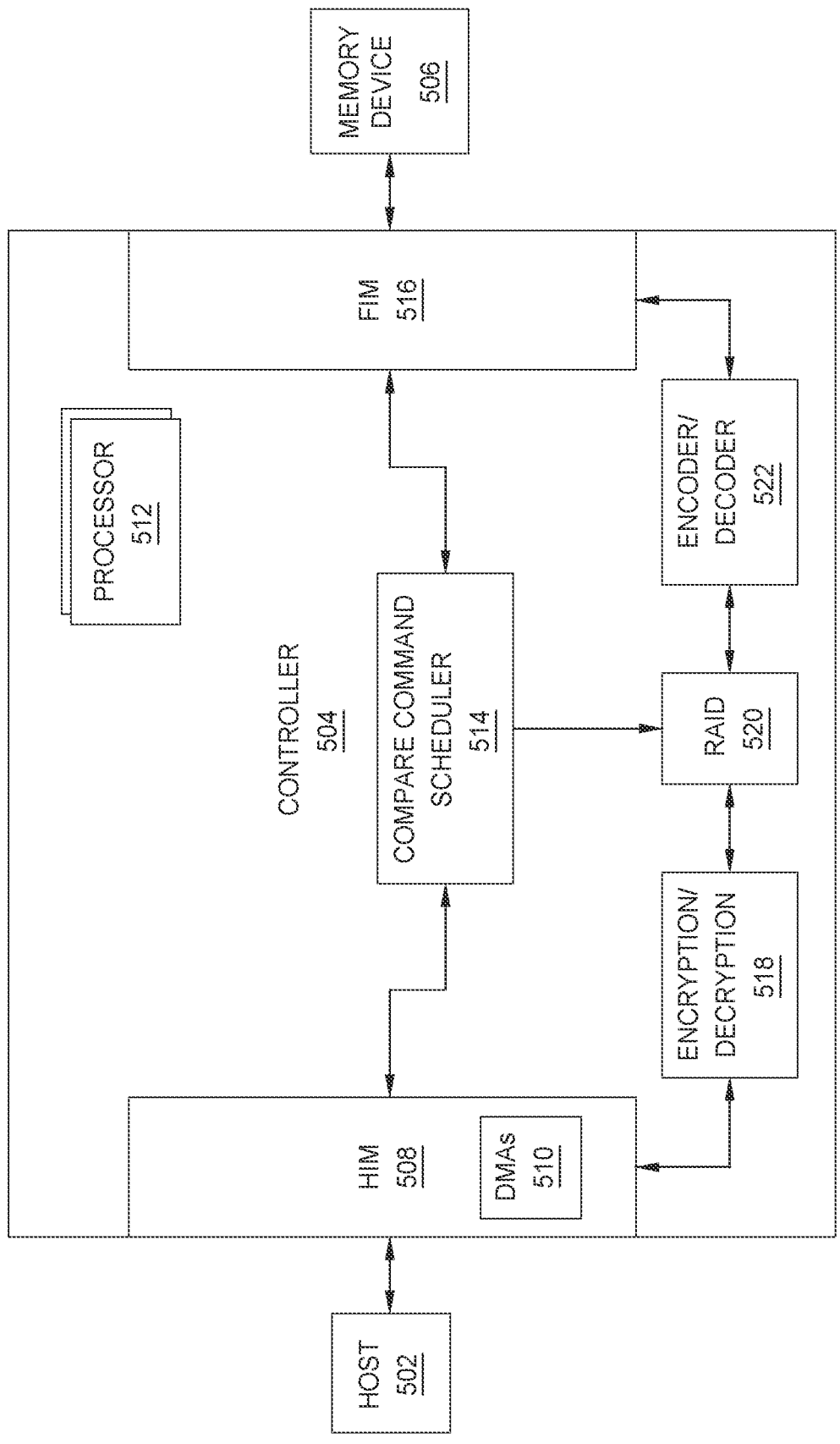
FIG. 5 is a schematic illustration of a storage system according to another embodiment.

FIG. 5 is a schematic illustration of a storage system 500 according to another embodiment. The system 500 includes a host device 502 coupled to a memory device 506 through a controller 504. The controller 504 includes a host interface module (HIM) 508 for interfacing with the host device 502. The HIM 508 includes one or more direct memory access modules (DMAs) 510. The controller 504 also includes a flash interface module (FIM) 516 for interfacing with the memory device 506. The controller 504 also includes an encoder/decoder 522 that is coupled to the FIM 516 and the RAID engine 520. The RAID engine 520 is coupled to the encoder/decoder 522 and an encryption/decryption module 518. The encryption/decryption module 518 is coupled to the HIM 508.

The controller 504 additionally includes a compare command scheduler 514 that is coupled to the RAID engine 520. The compare scheduler 514 may be firmware or hardware. The compare command scheduler 514 synchronizes the data transfer from the host device 502 and the data transfer from the memory device 506. The host data transfer ordering is the same as the memory device 506 data transfer order, which is not necessarily equal to the command offset ordering. Such an approach utilizes fewer buffers in the compare command execution. Additionally, the compare command scheduler 514 activates the RAID engine 520 for comparing the memory device data and the host device data needed for the compare command execution. In one embodiment, the entire host data and memory device data is XORed in the RAID engine 520. If the final value of the XOR buffer is 0, then the host data and the memory device data is the same and the compare command has successfully completed. If the final value of the XOR buffer is 1, then the host data and the memory device data is not the same and the compare command has failed.

By comparing data prior to retrieving all of the data to compare, compare failures can be detected early and successful compare commands can be completed earlier. The faster and earlier completion ensures the compare command is performed efficiently to meet performance requirements in either an enterprise SSD environment or a client SSD environment. The performance of the execution of the compare command is very high due to the usage of the already implemented RAID engine in the device controller. The RAID engine is just used to accelerate the execution of the compare command. Furthermore, the data transfer ordering from the host device is synchronized with the fetched data from the memory device. The data is fetched from the host device just in time and in the order defined by the memory device scheduling in the read flow. Fewer buffers are needed in order to support the same bandwidth for compare commands due to the concept discussed herein.

In one embodiment, a data storage device comprises: a memory device; and a controller coupled to the memory device, wherein the controller is configured to: fetch a compare command from a host device; retrieve a chunk of data from the memory device, wherein the chunk of data is less than all data associated with the compare command, and wherein the chunk of data is retrieved from the memory device; retrieve relevant chunk of data from the host device, wherein the relevant chunk of data; compare the chunk of data and the relevant chunk of data; and enter a completion entry to a completion queue of the host device. The controller is further configured to decode the chunk of data. The decoding occurs in parallel with the retrieving the relevant chunk of data from the host device. The comparing occurs with a redundant array of inexpensive/independent disks (RAID). The controller is further configured to allocate an XOR bin for executing the compare command. The controller is further configured to schedule read requests for retrieving all the data associated with the compare command. The completion entry indicate the compare command failed upon finding a mismatch between the chunk of data and the relevant chunk of data. The relevant chunk of data is retrieved out of order. The controller is further configured to ignore or cancel all other retrieving associated with the compare command upon finding a mismatch between the chunk of data and the relevant chunk of data. The relevant chunk of data has a same offset from the compare command as the chunk of data.

In another embodiment, a data storage device comprises: a memory device; and a controller coupled to the memory device, wherein the controller is configured to: compare less than all data for a compare command, wherein the data is data retrieved from the memory device and from a host device, wherein the comparing is performed using a redundant array of inexpensive/independent disks (RAID). The controller is further configured to deliver a compare command failure indication to a completion queue in the host device after comparing less than all data for the compare command. The controller is configured to retrieve the data from the host device in an order that matches data retrieved from the memory device. The order retrieved from the host device is out of order that the data is stored in the host device. The controller is further configured to decode data retrieved from the memory device in parallel with retrieving data from the host device.

In another embodiment, a data storage device comprises: memory means; and a controller coupled to the memory means, wherein the controller is configured to: fetch less than all data to be compared from a host device; decode a chunk of data retrieved from the memory means, wherein the decoding and the fetching occur in parallel; and compare the fetched data and decoded chunk of data. The controller comprises a compare command scheduler. The compare command scheduler is firmware. The compare command scheduler is coupled to a redundant array of inexpensive/independent disks (RAID). The compare command scheduler is coupled to a flash interface module and a host interface module.

While the foregoing is directed to embodiments of the present disclosure, other and further embodiments of the disclosure may be devised without departing from the basic scope thereof, and the scope thereof is determined by the claims that follow.

What is claimed is:

1. A data storage device, comprising:
a memory device; and
a controller coupled to the memory device, wherein the controller is configured to:
  fetch a compare command from a host device;
  retrieve a chunk of data from the memory device, wherein the chunk of data is less than all data associated with the compare command;
  retrieve relevant chunk of data from the host device, wherein the relevant chunk of data is retrieved from a different location than the chunk of data retrieved from the memory device, wherein the relevant chunk of data is retrieved out of order from which the relevant chunk of data appears in the host device;
  compare the chunk of data and the relevant chunk of data, wherein the comparing comprises:
    determining that the chunk of data is equivalent to the relevant chunk of data and then comparing a remainder of data associated with the compare command; or
    determining that the chunk of data is not equal to the relevant chunk of data; and
  enter a completion entry to a completion queue of the host device.

2. The data storage device of claim 1, wherein the controller is further configured to decode the chunk of data.

3. The data storage device of claim 2, wherein the decoding occurs in parallel with the retrieving the relevant chunk of data from the host device.

4. The data storage device of claim 1, wherein the comparing occurs with a redundant array of inexpensive/independent disks (RAID).

5. The data storage device of claim 1, wherein the controller is further configured to allocate an XOR bin for executing the compare command.

6. The data storage device of claim 1, wherein the controller is further configured to schedule read requests for retrieving all the data associated with the compare command.

7. The data storage device of claim 1, wherein the completion entry indicate the compare command failed upon finding a mismatch between the chunk of data and the relevant chunk of data.

8. The data storage device of claim 1, wherein the relevant chunk of data is retrieved out of order.

9. The data storage device of claim 1, wherein the controller is further configured to ignore or cancel all other retrieving associated with the compare command upon finding a mismatch between the chunk of data and the relevant chunk of data.

10. The data storage device of claim 1, wherein the relevant chunk of data has a same offset as the chunk of data.

11. A data storage device, comprising:
a memory device; and
a controller coupled to the memory device, wherein the controller is configured to:
compare less than all data for a compare command, wherein the data is data retrieved from the memory device and from a host device, wherein the comparing is performed using a redundant array of inexpensive/independent disks (RAID), wherein the less than all data for the compare command is a chunk of data from the memory device and a relevant chunk of data from the host device, wherein the relevant chunk of data is retrieved out of order from which the relevant chunk of data appears in the host device, wherein the relevant chunk of data is retrieved from a different location than the chunk of data retrieved from the memory device.

12. The data storage device of claim 11, wherein the controller is further configured to deliver a compare command failure indication to a completion queue in the host device after comparing less than all data for the compare command.

13. The data storage device of claim 11, wherein the controller is configured to retrieve the data from the host device in an order that matches data retrieved from the memory device.

14. The data storage device of claim 13, wherein the order retrieved from the host device is out of order that the data is stored in the host device.

15. The data storage device of claim 11, wherein the controller is further configured to decode data retrieved from the memory device in parallel with retrieving data from the host device.

16. A data storage device, comprising:
memory means; and
a controller coupled to the memory means, wherein the controller is configured to:
fetch less than all data to be compared from a host device, wherein the less than all data to be compared from the host device is a relevant chunk of data retrieved from the host device, wherein the relevant chunk of data compared to a chunk of data from the memory device, wherein the relevant chunk of data is retrieved out of order from which the relevant chunk of data appears in the host device, and wherein the relevant chunk of data is retrieved from a different location than the chunk of data retrieved from the memory means;
decode a chunk of data retrieved from the memory means, wherein the decoding and the fetching occur in parallel; and
compare the fetched data and decoded chunk of data.

17. The data storage device of claim 12, wherein the controller comprises a compare command scheduler.

18. The data storage device of claim 17, wherein the compare command scheduler is firmware.

19. The data storage device of claim 17, wherein the compare command scheduler is coupled to a redundant array of inexpensive/independent disks (RAID).

20. The data storage device of claim 17, wherein the compare command scheduler is coupled to a flash interface module and a host interface module.

* * * * *